United States Patent
Yasui et al.

(10) Patent No.: US 7,925,015 B2
(45) Date of Patent: Apr. 12, 2011

(54) IMAGE FORMING SYSTEM, COMPUTER-READABLE RECORDING MEDIUM STORING A SETTING CHANGE PROGRAM, AND SETTING CHANGE METHOD

(75) Inventors: Toru Yasui, Osaka (JP); Takashi Araki, Osaka (JP); Keiko Fujii, Osaka (JP)

(73) Assignee: Kyocera Mita Corporation, Osaka-shi, Osaka (JP)

( * ) Notice: Subject to any disclaimer, the term of this patent is extended or adjusted under 35 U.S.C. 154(b) by 1047 days.

(21) Appl. No.: 11/528,685

(22) Filed: Sep. 28, 2006

(65) Prior Publication Data

US 2007/0079374 A1    Apr. 5, 2007

(30) Foreign Application Priority Data

Oct. 4, 2005  (JP) ............................. JP2005-291563

(51) Int. Cl.
*G09C 3/00* (2006.01)
(52) U.S. Cl. ................ 380/55; 380/51; 380/54; 726/22; 726/26; 726/28; 713/182; 713/185
(58) Field of Classification Search .................. None
See application file for complete search history.

(56) References Cited

U.S. PATENT DOCUMENTS

| | | | |
|---|---|---|---|
| 7,684,064 B2 * | 3/2010 | Kimura et al. ................ | 358/1.14 |
| 2001/0016912 A1 * | 8/2001 | Takahashi ...................... | 713/200 |
| 2003/0120954 A1 * | 6/2003 | Sugiyama ..................... | 713/201 |
| 2004/0006631 A1 | 1/2004 | Nonaka et al. | |
| 2004/0075861 A1 * | 4/2004 | Shima et al. .................. | 358/1.15 |
| 2004/0161277 A1 * | 8/2004 | Gassho et al. .................. | 400/76 |
| 2005/0120244 A1 * | 6/2005 | Choi .............................. | 713/201 |
| 2005/0152543 A1 * | 7/2005 | Shima et al. .................... | 380/51 |
| 2005/0183141 A1 * | 8/2005 | Sawada .......................... | 726/16 |
| 2005/0264840 A1 * | 12/2005 | Niitsuma ..................... | 358/1.14 |

FOREIGN PATENT DOCUMENTS

| | | |
|---|---|---|
| JP | 2004-38440 A | 2/2004 |
| JP | 2004-133906 A | 4/2004 |
| JP | 2004-246416 A | 9/2004 |
| JP | 2004-334449 A | 11/2004 |

* cited by examiner

*Primary Examiner* — Taghi T Arani
*Assistant Examiner* — Amir Mehrmanesh
(74) *Attorney, Agent, or Firm* — Westerman, Hattori, Daniels & Adrian, LLP

(57) ABSTRACT

An image forming system according to one embodiment of the present invention has a user authentication mode for granting only authorized users a setting change for an image forming apparatus. This image forming apparatus 200 includes a user authentication section 203 to perform authentication on receiving user information from a host computer 100. The image forming apparatus 200 also issues an authentication key for an authorized user and sends the key to the host computer 100. The host computer 100 sends a changed setting and the authentication key to the image forming apparatus 200, whereby making the setting change swiftly. This structure makes it possible to address a problem with related art systems that send user information every time a setting is changed and send a changed setting only when a user is deemed to have authority where authentication is redundant and time consuming.

8 Claims, 6 Drawing Sheets

IMAGE FORMING SYSTEM, COMPUTER-READABLE RECORDING MEDIUM STORING A SETTING CHANGE PROGRAM, AND SETTING CHANGE METHOD

BACKGROUND

1. Field of the Invention

The present invention relates to an image forming system including an image forming apparatus and a computer or other terminal coupled to the apparatus. In particular, the invention relates to such an image forming system that checks authentication information input from the terminal to grant an authorized user a setting change for the image forming apparatus.

2. Related Art

When an unspecified number of people share a single printer and each one of them has access to change its default settings, they may not be able to get their documents printed just as they expected. For example, when a user who wants one-sided printing and gets his document printed with a printer without knowing another user has just set two-sided printing for the printer, this user will end up having a bunch of two-sided prints. Another concern about sharing a printer between two or more users, each of who can change its settings, is leakage of data stored therein.

To cope with these problems, an image forming apparatus (printer) typically has a user authentication mode for granting only authorized users the authority to change the default settings among those who have registered to use the printer.

The user authentication mode, however, involves another problem. When the mode is working, the terminal coupled to the printer sends user information such as a user ID and password every time the user tries to change the settings for the printer. Then, only if the user is deemed to have authority to make a change, the terminal sends the setting change to the printer. If the user wants to make multiple changes in the printer settings, this authentication is repeated every time the user tries to send a setting change. Therefore, it takes quite a long time to complete the setting change through time-consuming means of communications such as local connections.

For example, Japanese Patent Laid-Open Publication No. JP-2004-133906-A discloses an image forming apparatus, a use authentication information issue method, and a use authentication information issue system capable of reducing an unnecessary authentication process for certain services provided by the image forming apparatus (compound machine) with printer, fax, and copier functions etc. involving password authentication and used repeatedly.

When the image forming apparatus disclosed in JP-2004-133906-A receives a session establishment request including authentication information from external network equipment, the apparatus executes an authentication process on the basis of the session establishment request, generates session information and session identification information, and transmits the information to the network equipment. When receiving a prescribed processing request using the session identification information from the network equipment, the image forming apparatus decides the session information corresponding to the session identification information, and executes the prescribed processing request received from the network equipment according to contents of the session information.

Using the session identification information in this manner can eliminate the need to repeat the authentication process when processing is deemed to be executed by the same session. It is therefore possible to avoid redundancy in the authentication process.

Since the session identification information used in JP-2004-133906-A includes the IP addresses of the network equipment executing a processing request and of the image forming apparatus having a session established as well as a term of validity, the information may be abused by a third party. Moreover, JP-2004-133906-A does not disclose the use of an authentication key as the session identification information so as to grant only authorized users specific processing.

SUMMARY OF THE INVENTION

A primary advantage of the present invention is to reduce time to complete processing for an image forming apparatus requested by a terminal while the user authentication mode is working to grant limited users the processing.

Another advantage of the invention is to reduce the number of user authentication for a processing request to the image forming apparatus or a setting change for the apparatus, thereby reducing the number of communications and the amount of data transferred between the terminal and image forming apparatus.

Still another advantage of the invention is to reduce time to change the settings for the image forming apparatus from the terminal.

Moreover, further another advantage of the invention is to achieve the above-mentioned aims in a highly secure manner, for example, by preventing an abuse of user information.

To address the above-described issues, an image forming system according to claim 1 of the invention includes a terminal; an image forming apparatus; communications means to couple to said terminal and said image forming apparatus; user interface means to accept and send an input of user information and a request of processing from said terminal to said image forming apparatus via said communications means; and user authentication means to check said user information sent by said terminal, issue an authentication key for a user deemed to have authority, and send said key from said image forming apparatus to said terminal via said communications means; said terminal sending the authentication key received from said image forming apparatus to said image forming apparatus via said communications means when sending the request of processing accepted by said user interface means to said image forming apparatus.

An image forming system according to claim 2 of the present invention includes a terminal; an image forming apparatus; communications means to couple the terminal and the image forming apparatus; user interface means to accept an input of user information at login, send the user information from the terminal to the image forming apparatus via the communications means, accept an input of a request of processing after the login, and send the request from the terminal to the image forming apparatus via the communications means; and user authentication means to check the user information sent from the terminal at the login, issue an authentication key for an authorized user, and send the key from the image forming apparatus to the terminal via the communications means. According to claim 3 of the invention, in the image forming system according to claim 2, the terminal sends the authentication key received from the image forming apparatus to the image forming apparatus via the communications means when sending the request of processing accepted by the user interface means to the image forming apparatus.

According to claim 4 of the invention, in the image forming system according to claim 2, the image forming system further comprises setting change means to accept an input of setting change information to change a setting for said image forming apparatus: wherein said user interface means has said setting change means, and said user interface means sends the setting change information input with said setting change means together with said authentication key from said terminal to said image forming apparatus via said communications means.

According to claim 5 of the invention, in the image forming system according to claim 2, the image forming system further comprises user information controlling means to store the authentication key received from the image forming apparatus: wherein said terminal has said user information controlling means, and the user interface means acquires the authentication key stored in the user information controlling means and sends the authentication key to the image forming apparatus via the communications means when sending the request of processing to the image forming apparatus.

According to claim 6 of the invention, in the image forming system according to claim 2, the user authentication means sets a term of validity for the authentication key, the term of validity being predetermined or updated every time the image forming apparatus receives the authentication key together with the request for processing.

According to claim 7 of the invention, in the image forming system according to claim 2, the user authentication means deletes the authentication key in response to a request from the user interface means or the issue of another authentication key by the user authentication means.

A computer-readable recording medium according to claim 8 of the invention stores a program that makes a computer of a terminal coupled to an image forming apparatus achieve the functions of accepting an input of user information; sending the input user information to the image forming apparatus; receiving an authentication key sent from the image forming apparatus; accepting an input of setting change information to change a setting for the image forming apparatus; and sending the input setting change information together with the received authentication key to the image forming apparatus.

A computer-readable recording medium according to claim 9 of the invention stores a program that makes a computer of an image forming apparatus coupled to a terminal achieve the functions of receiving user information sent from the terminal; verifying the received user information and issuing an authentication key for a user deemed to have authority; sending the authentication key to the terminal; receiving the authentication key and setting change information to change a setting for the image forming apparatus sent by the terminal; and changing the setting for the image forming apparatus based on the setting change information if the received authentication key and the issued authentication key correspond.

A setting change method according to claim 10 of the invention for an image forming system including a terminal and an image forming apparatus coupled to the terminal includes accepting an input of user information with the terminal, sending the input user information from the terminal to the image forming apparatus, verifying the user information received by the image forming apparatus and the user deemed to have authority based on said verification of said user information, sending the issued authentication key from the image forming apparatus to the terminal, accepting an input of setting change information with the terminal, sending the setting change information together with the authentication key from the terminal to the image forming apparatus, and changing the setting for the image forming apparatus based on the setting change information if the authentication key received from the terminal and the authentication key issued by the image forming apparatus correspond.

According to claim 1 of the invention, the authentication key issued only for authorized users is sent together with the request for processing from the terminal to the image forming apparatus. It is therefore possible to avoid redundancy in the authentication of the user information for every processing request, thereby time for responding to the request can be reduced and the number of communications and the amount of data transferred between the terminal and image forming apparatus can be reduced.

According to claim 2 of the invention, the terminal sends the user information to the image forming apparatus and the user authentication means checks the user information only when the user logs in. It is therefore possible to avoid redundancy in the authentication of the user information for every processing request, thereby time for responding to the request can be reduced and the number of communications and the amount of data transferred between the terminal and image forming apparatus can be reduced.

According to claim 3 of the invention, the authentication key issued only for authorized users is sent together with the request for processing from the terminal to the image forming apparatus. It is therefore possible to avoid redundancy in the authentication of the user information for every processing request, thereby time for responding to the request can be reduced and the number of communications and the amount of data transferred between the terminal and image forming apparatus can be reduced.

According to claim 4 of the invention, the user interface means accepts an input of the setting change information to change a setting for the image forming apparatus, making it possible to more easily and swiftly change the setting. Furthermore, the authentication key issued only for authorized users is sent together with the setting changed by the terminal to the image forming apparatus. It is therefore possible to avoid redundancy in the authentication of the user information, thereby time for the setting change can be reduced and the number of communications and the amount of data transferred between the terminal and image forming apparatus can be reduced as with the system according to claim 3.

According to claim 5 of the invention, the terminal saves the authentication key received from the image forming apparatus. It is therefore possible to easily call up the authentication key when making the request for processing and a setting change for the image forming apparatus and send the key to the image forming apparatus.

According to claim 6 of the invention, a term of validity is specified for the authentication key. It is therefore possible to prevent a case where unused keys remain to be saved and are abused when communications trouble between the terminal and image forming apparatus occurs or an abnormal termination of the program happens.

According to claim 7 of the invention, the authentication key is deleted, making it possible to prevent a case where unused keys remain to be saved and are abused as with the system according to claim 6.

The computer-readable recording medium according to claim 8 of the invention stores a program that makes a computer of a terminal coupled to an image forming apparatus achieve the functions of: accepting an input of user information; sending the input user information to the image forming apparatus; receiving an authentication key sent from the image forming apparatus; accepting an input of setting change information to change a setting for the image forming apparatus; and sending the input setting change information together with the received authentication key to the image forming apparatus.

By making the computer of the terminal coupled to the image forming apparatus execute the program stored in the recording medium, it is possible to input the user information to the terminal, send the information to the image forming apparatus, and send the authentication key received from the apparatus to the apparatus together with the setting changed by the terminal. Consequently, the number of communications between the terminal and image forming apparatus can be reduced and time for the setting change can be reduced.

The computer-readable recording medium according to claim 9 of the invention stores a program that makes a computer of an image forming apparatus coupled to a terminal achieve the functions of receiving user information sent from the terminal; verifying the received user information and issuing an authentication key for a user deemed to have authority; sending the authentication key to the terminal; receiving the authentication key and setting change information to change a setting for the image forming apparatus sent by the terminal; and changing the setting for the image forming apparatus based on the setting change information if the received authentication key and the issued authentication key correspond.

By making the computer of the image forming apparatus coupled to the terminal execute the program stored in the recording medium, it is possible to receive the user information sent by the terminal, issue the authentication key only for authorized users and send the key to the terminal, and on the reception of the key and setting change information change the setting for the image forming apparatus if the key is valid. Consequently, the number of communications between the terminal and image forming apparatus can be reduced and time for the setting change can be reduced.

By the setting change method according to claim 10 of the invention, the authentication key issued only for authorized users is sent together with the request for processing from the terminal to the image forming apparatus. It is therefore possible to avoid redundancy in the authentication of the user information for every processing request, thereby time for responding to the request is reduced and the number of communications and the amount of data transferred between the terminal and image forming apparatus are reduced.

BRIEF DESCRIPTION OF THE PREFERRED EMBODIMENTS

An embodiment of the present invention will now be described with reference to the accompanying drawings. It should be understood that the embodiment described herein is given by way of example to show a system to embody the technical idea of the invention, and is not intended to limit the invention to this system. The invention is also applicable to other systems that fall under the claims of the invention.

Embodiment

Figure 1:
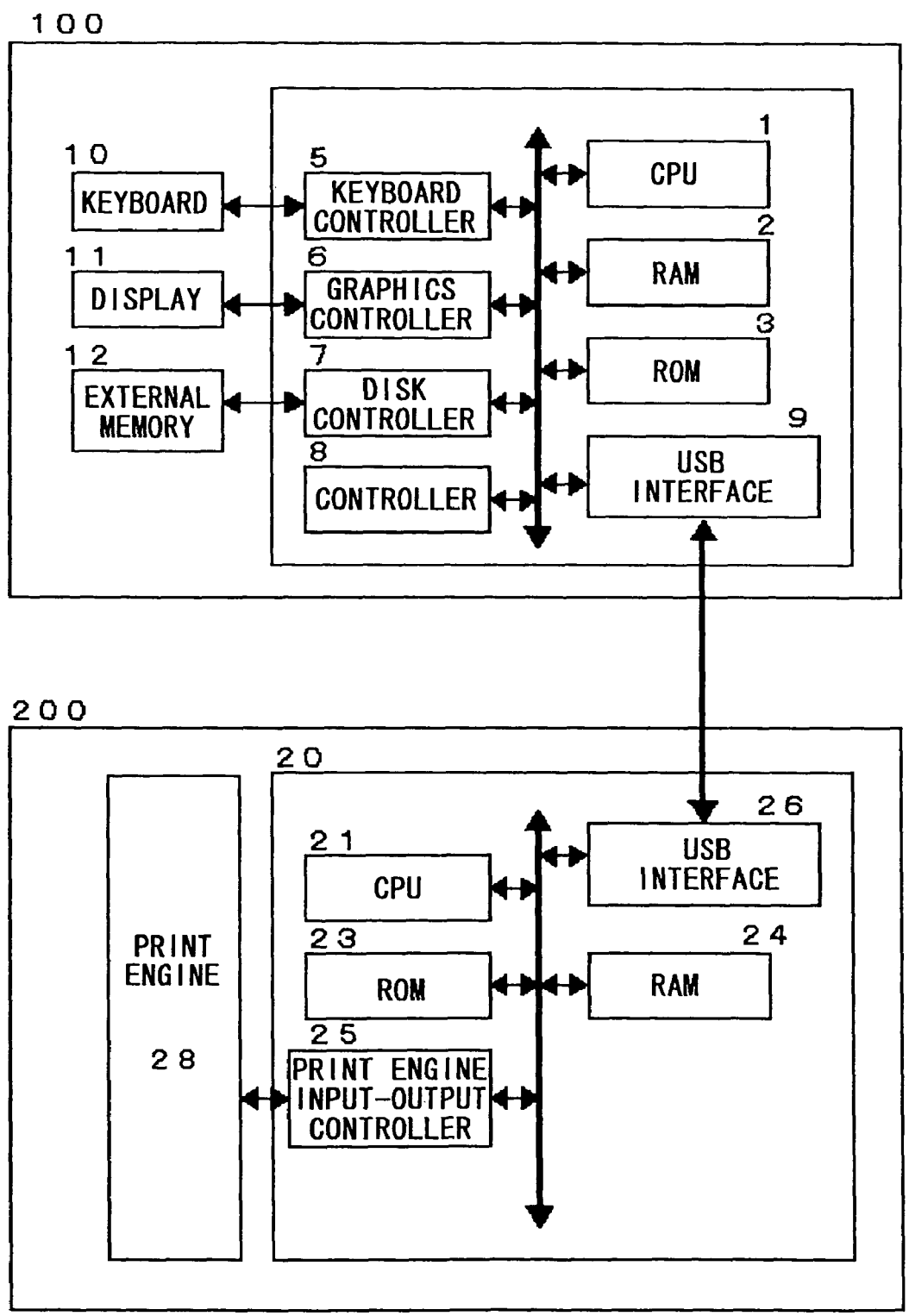
FIG. 1 is an internal block diagram of a setting change system according to an embodiment of the present invention.

A setting change system according to one embodiment of the present invention will now be described with reference to FIGS. 1 through 6. FIG. 1 is an internal block diagram of a host computer 100 and an image forming apparatus 200 included in the setting change system. In the host computer 100, a random access memory (RAM) 2 reads and a central processing unit (CPU) 1 executes a program stored in an external memory 12. The program executed by the host computer 100 includes a setting change program to change various settings for the image forming apparatus according to the present embodiment.

The CPU 1 totally controls individual devices coupled to a system bus 4 as well as executing the setting change program. The RAM 2 functions as a main memory and work area, for example, of the CPU 1 to operate the setting change program according to the present embodiment. A keyboard controller 5 controls input from a keyboard 10 or other pointing device (not shown). A graphics controller 6 controls images appeared on a display 11. A disk controller 7 controls access to the external memory 12, such as a hard disk or CD-ROM, storing application programs, for example. A universal serial bus (USB) interface controller 9 controls and processes two-way communications with the image forming apparatus 200 via a USB interface.

The image forming apparatus 200 includes a printer controller 20 and a print engine 28. The printer controller 20 converts image data received from the host computer 100 into video data, changes various settings, and controls the print engine 28 in accordance with a processing request received from the host computer 100. Controlled by the printer controller 20, the print engine 28 prints video data on paper, for example.

The printer controller 20 includes a CPU 21, a read-only memory (ROM) 23, a RAM 24, a print engine input-output controller 25, and a USB interface controller 26. The CPU 21 totally controls individual devices coupled to a system bus 27 and also operates the printer controller 20 based on a program stored in the ROM 23. Specifically, the CPU 21 according to the present embodiment performs user authentication, issues an authentication key, and changes various settings for the image forming apparatus in response to requests from the host computer. The ROM 23 stores various programs for operating the image forming apparatus as well as various settings, product information, and other data.

The RAM 24 functions as a memory area storing settings and user information as well as a work area in order for the CPU 21 to execute the program. The print engine input-output controller 25 outputs video data or other operational instructions to the print engine. The USB interface controller 26 enables two-way communications with the host computer 100. While USB is used as the communications interfaces between the host computer 100 and the image forming apparatus 200 here, two-way parallel or IEEE1394 interfaces can be used instead.

Figure 2:
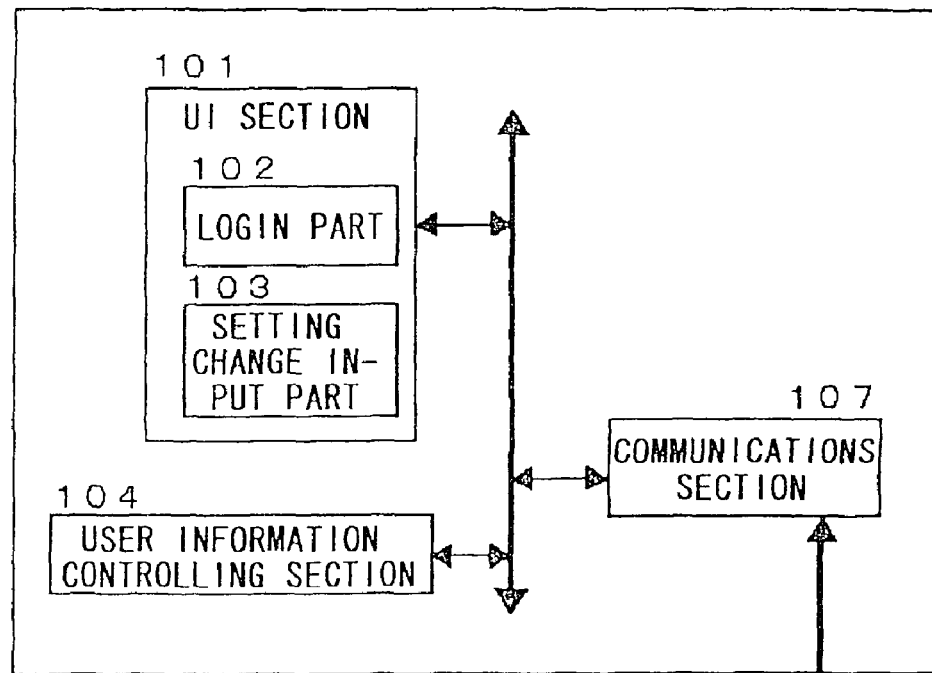
FIG. 2 is a functional diagram of the setting change system according to the present embodiment.
Figure 2:
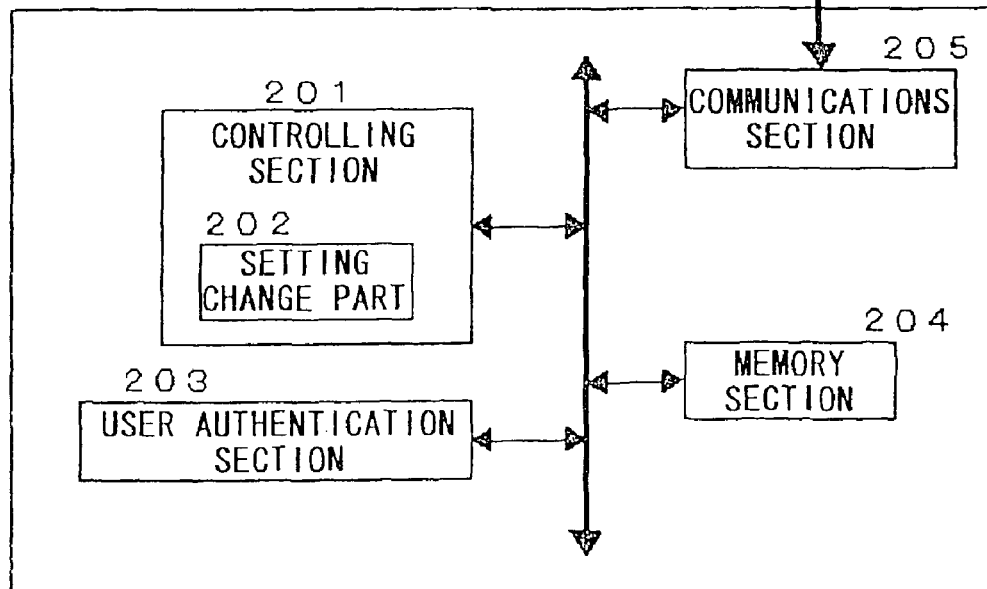

FIG. 2 depicts a functional diagram 1000 for the host computer 100 and a functional diagram 2000 for the printer controller 20 that is included in the image forming apparatus 200 as shown in FIG. 1. The host computer 100 includes a UI section 101, a user information controlling section 104, and a communications section 107. The UI section 101 includes a login part 102 and a setting change input part 103, and makes the display 11 display various windows, so that the user can make various settings and operations while referring to the display. The login part 102 makes the display 11 display a login window for starting the setting change program of the image forming apparatus according to the present embodiment and asking the user to input user information such as a user ID and password. The setting change input part 103 makes the display 11 display a setting change window for making various setting changes for the image forming apparatus to accept inputs made by the user.

The user information controlling section 104 stores user information input by the user and the authentication key received from the image forming apparatus 200, for example. The communications section 107 transmits the user information to the image forming apparatus 200 when the user logs in. The communications section 107 also transmits the setting change made by the user with the setting change window displayed by the setting change input part 103 to the image forming apparatus.

The printer controller 20 included in the image forming apparatus 200 includes a controlling section 201, a user authentication section 203, a memory section 204, and a communications section 205. The controlling section 201 includes a setting change part 202 and sets and changes various settings for the image forming apparatus 200 in response to an instruction by the host computer 100. The user authentication section 203 checks the user ID and password sent by the host computer 100 against user information stored in the memory section 204, and issues an authentication key if the user has authority.

The memory section 204 stores the user information including user IDs and passwords of authorized users and other data showing which users have authority to make setting changes. The information is stored by an administrator in advance. The memory section 204 also stores the authentication key issued by the user authentication section 203. The communications section 205 receives the user information and settings, etc., sent by the host computer 100. The communications section 205 also transfers the authentication key issued by the user authentication section 203 to the host computer 100.

Figure 3:
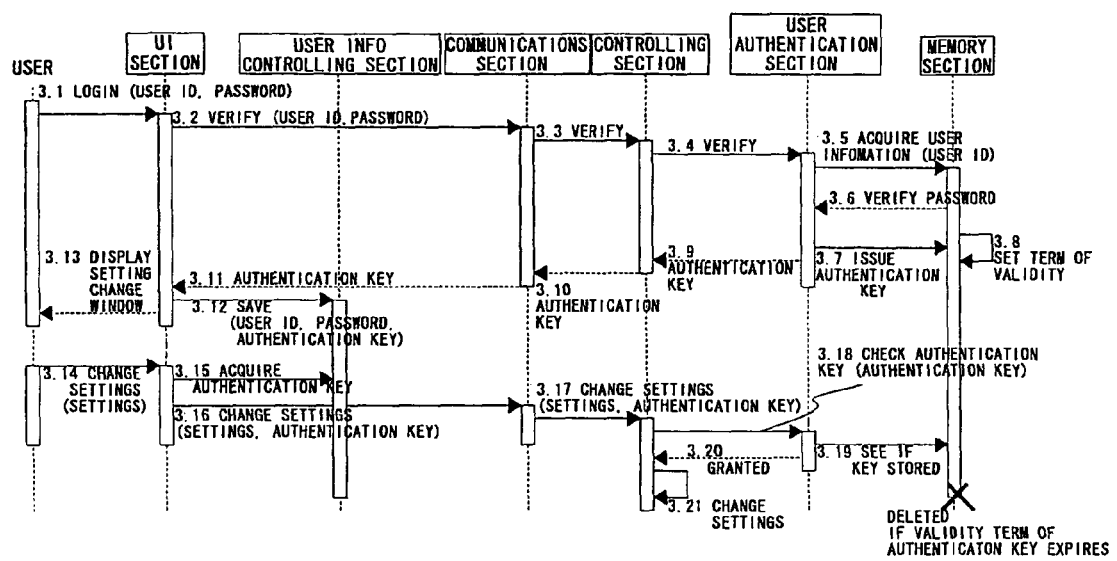
FIG. 3 is a sequence diagram showing the operation of each component for user authentication and setting changes in the setting change system according to the present embodiment.
Figure 4:
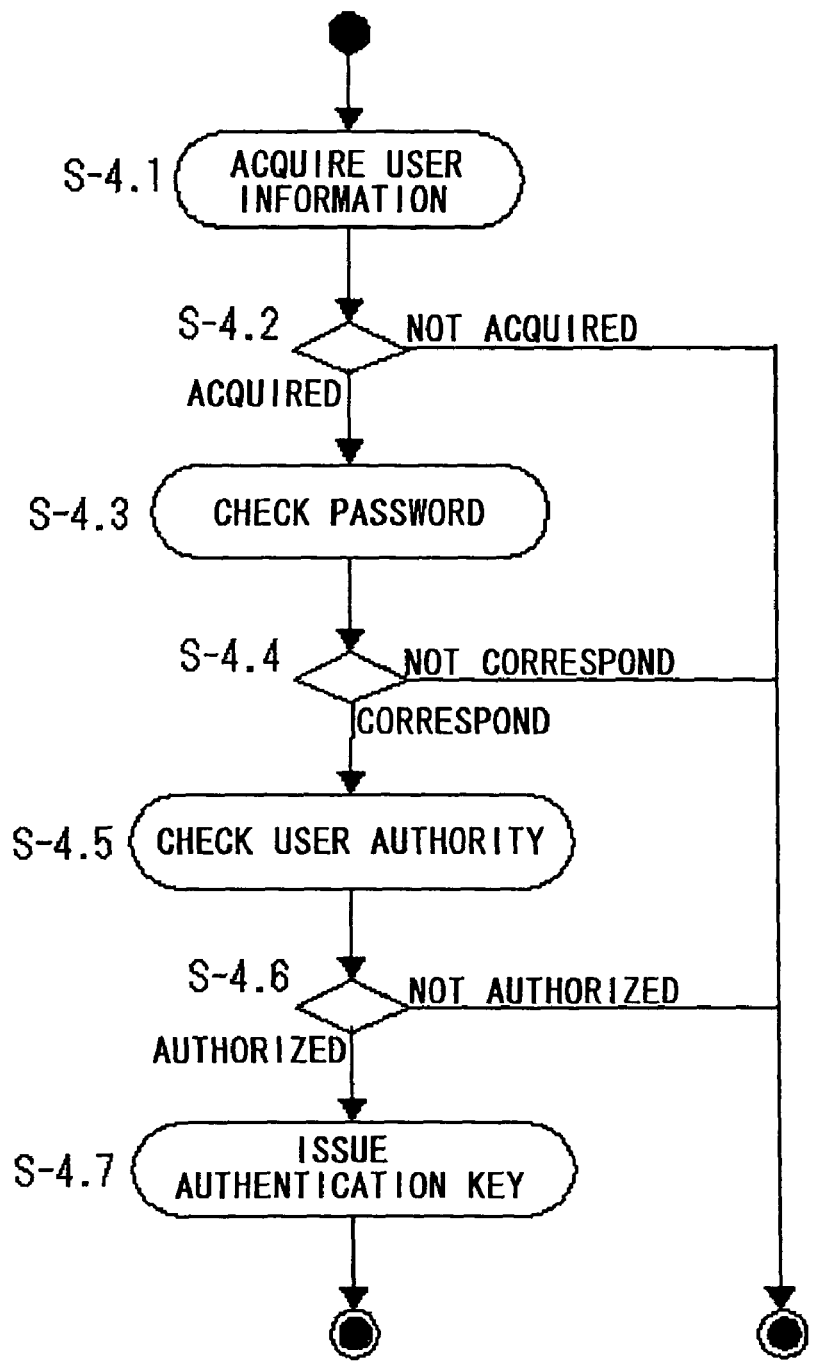
FIG. 4 is an activity diagram showing the flow of user authentication followed by the issue of an authentication key according to the present embodiment.

Referring next to FIGS. 3 and 4, the operation flow of the setting change system from user authentication to setting change completion will be described. FIG. 3 is a sequence diagram showing the operation of each component for user authentication and setting changes in the setting change system. FIG. 4 is an activity diagram showing the flow of user authentication followed by the issue of the authentication key.

When the setting change program is started, the login part 102 included in the UI section 101 makes the display 11 display a login window. The user can input user information such as a user ID and password with this login window to make a login request (Step 3.1). The user information accepted by the login part 102 is reported to the communications section 107 (Step 3.2). The communications section 107 then transfers the information to the controlling section 201 included in the image forming apparatus 200 via the communications section 205 included in the image forming apparatus 200 (Step 3.3).

The controlling section 201 sends the user information that it has received to the user authentication section 203 to perform authentication by seeing whether the user who is making a login request has authority to change settings (Step 3.4). The user authentication section 203 accesses the memory section 204 to see if the user ID and password are authorized (Step 3.5). If they are authorized (Step 3.6), the user authentication section 203 issues an authentication key and stores it in the memory section 204 (Step 3.7). Here, a term of validity is specified for the authentication key. The information on the term is also stored in the memory section 204 (Step 3.8).

The user authentication section 203 transfers the issued authentication key back to the controlling section 201 (Step 3.9). The controlling section 201 then sends the authentication key to the communications section 107 included in the host computer 100 via the communications section 205 included in the image forming apparatus 200 (Step 3.10). The reception of the authentication key by the communications section 107 is reported to the UI section 101 (Step 3.11), where the user is deemed to succeed in logging in. Subsequently, the authentication key together with the user ID and password is stored in the user information controlling section 104 (Step 3.12). The setting change input part 103 included in the UI section 101 makes the display 11 display a setting change window to enable the user to input setting changes.

Referring now to FIG. 4, an example of user authentication by the user authentication section 203 and the memory section 204 will be described. FIG. 4 is an activity diagram showing the flow of user authentication followed by the issue of the authentication key.

On receiving the user information such as the user ID and password from the host computer 100, the user authentication section 203 accesses the memory section 204 in Step S-4.1 to acquire the user information corresponding to the user ID. The user information stored in the memory section 204 includes user IDs and passwords and other data showing which users have authority to make setting changes for the image forming apparatus 200. If the acquisition of the user information fails in Step S-4.2, error information etc. is sent to the host computer 100, which terminates the process.

If the acquisition of the user information succeeds in Step S-4.2, the password received from the host computer 100 is checked in subsequent Step S-4.3 against the password stored in the memory section 204. If the password is not verified in Step S-4.4, the user authentication section 203 creates an error message, which terminates the process. If the password is verified in Step S-4.4, the process proceeds to Step S-4.5 to see whether the user who is in this user authentication process has authority to make setting changes for the image forming apparatus 200.

If the user is deemed to have no authority to make setting changes in Step S-4.6, information showing this result is reported to the host computer 100, which terminates the process. If the user is deemed to have authority to make setting changes in Step S-4.7, an authentication key is issued in Step S-4.7 to be sent to the host computer 100.

Referring back to FIG. 3, the user inputs setting changes with the keyboard 10 while referring to the setting change window appeared on the display 11 by the setting change input part 103 included in the UI section 101 in Step 3.14. The UI section 101 acquires the authentication key stored in the user information controlling section 104 (Step 3.15). The acquired authentication key is then sent to the communications section 107 so as to be transferred to the image forming apparatus 200 together with the changed settings (Step 3.16).

The authentication key and changed settings are then sent from the communications section 107 to the controlling section 201 included in the image forming apparatus 200 (Step 3.17). On receiving the authentication key, the controlling section 201 refers the authentication key to the user authentication section 203 (Step 3.18). In response to the request of the reference of the authentication key, the user authentication section 203 sees whether the authentication key is stored in the memory section 204 (Step 3.19). If the authentication key is stored in the memory section 204, the user authentication section 203 informs the controlling section 201 that the setting changes are granted (Step 3.20). Subsequently, the setting change part 202 included in the controlling section 201 changes the settings for the image forming apparatus 200 in accordance with the settings received from the host computer 100 together with the authentication key (Step 3.21).

The authentication key and changed settings are sent from the host computer 100 to the image forming apparatus 200 every time the user makes settings or setting changes while referring to the setting change window. The process from Steps 3.14 to 3.21 shown in FIG. 3 is repeated until every setting change is completed.

The authentication key stored in the memory section 204 included in the image forming apparatus 200 is deleted when the term of validity specified for the key expires and the key is deemed to have no authority thereafter. In other words, the host computer 100 cannot make any setting change for the image forming apparatus 200 by making a setting change request with the same key. The term of validity of the key and the process made by each component when the key is not available will be described in greater detail later.

Figure 5:
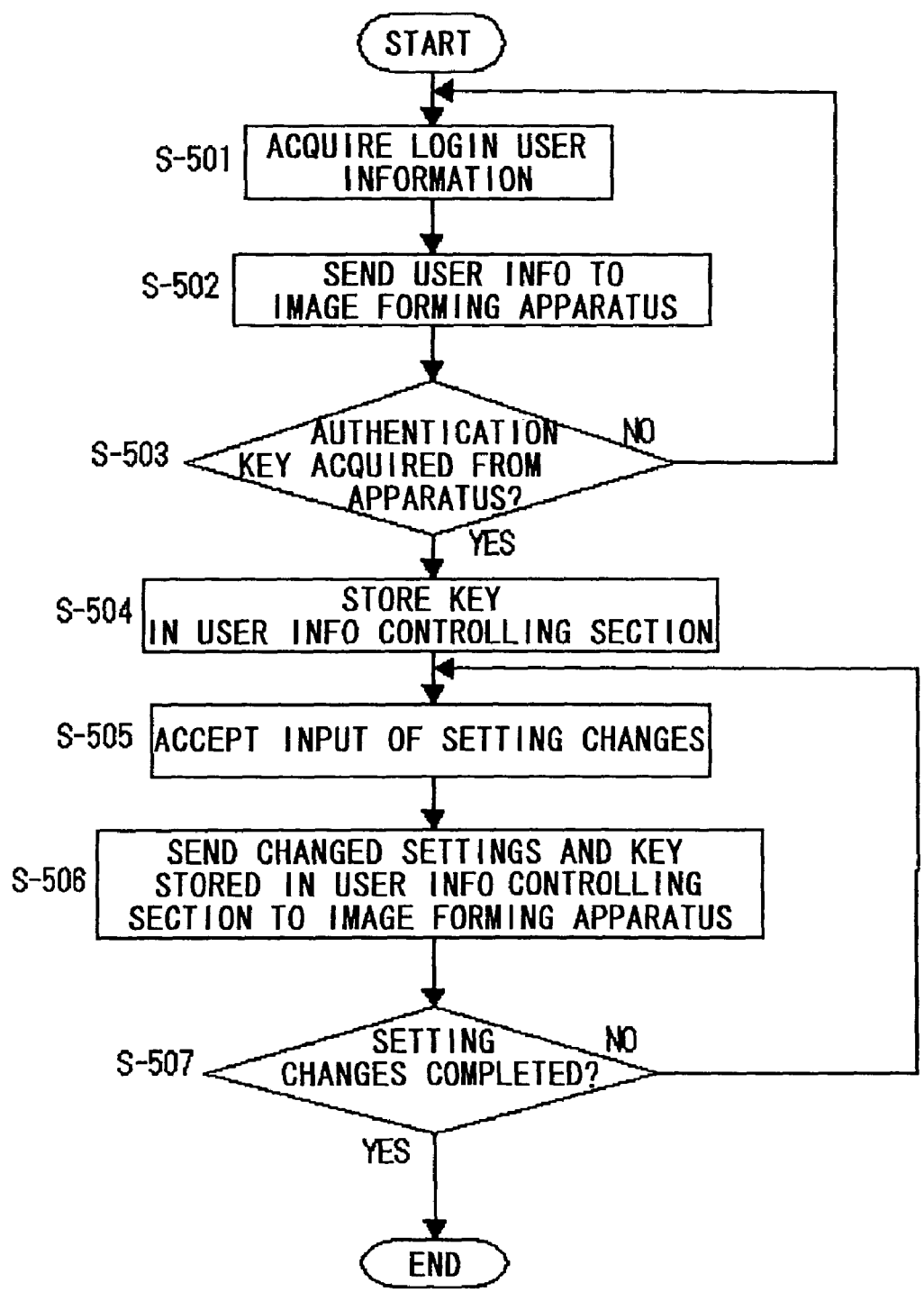
FIG. 5 is a flow chart showing the operation of the setting change program according to the present embodiment in a host computer.

Referring now to FIG. 5, the operation of the host computer while the user-authentication and setting-change program is working will be described. FIG. 5 is a flow chart showing the operation of the setting change program in the host computer 100. In Step S-501, the login part 102 included in the UI section 101 makes the display 11 display a login window to accept an input of user information. The user inputs the user information with the keyboard 10, for example, making the login part 102 acquire the information.

The UI section 101 then transmits the user information it has acquired to the image forming apparatus 200 (Step S-502). Subsequent Step S-503 is a waiting time for the reception of the authentication key from the image forming apparatus 200. The process will return to Step S-501 for re-login if no key is received during a predetermined period of time, the user information is wrong, or other error information is received.

If the authentication key is received from the image forming apparatus 200 in Step S-503, the key is stored in the user information controlling section 104 in Step S-504. In Step S-505, the setting change input part 103 included in the UI section 101 makes the display 11 display a setting change window to accept inputs of various setting changes for the image forming apparatus 200. When the setting change input part 103 makes a setting change, the UI section 101 sends the changed settings and the authentication key stored in the user information controlling section 104 to the image forming apparatus 200 via the communications section 107 (Step S-506).

Step S-507 is to see if every setting change made by the user is completed. The process in Steps S-505 and S-506 is repeated until every setting change is completed. The changed settings and authentication key are sent to the image forming apparatus 200 every time a setting change is made. On the completion of all setting changes made by the user, the user-authentication and setting-change program operating in the host computer 100 is completed.

Figure 6:
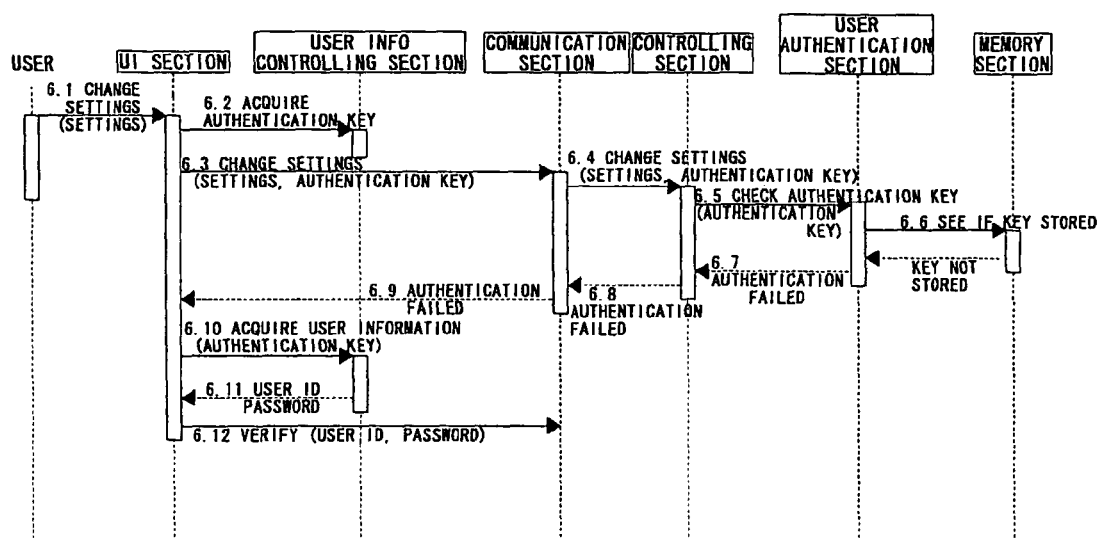
FIG. 6 is a sequence diagram showing the operation of each component for setting changes in the setting change system according to the present embodiment when authentication using an authentication key fails.

Referring now to FIG. 6, the operation of each component for setting changes when authentication using an authentication key fails will be described. FIG. 6 is a sequence diagram showing the operation of each component for setting changes in the setting change system according to the present embodiment when authentication using an authentication key fails.

The process starts with the user's making a setting change while referring to the setting change window appeared on the display 11 by the setting change input part 103 included in the UI section 101 (Step 6.1). The UI section 101 makes a request to acquire an authentication key to the user information controlling section 104 (Step 6.2) to acquire a corresponding authentication key. The UI section 101 then outputs the changed setting and authentication key to the communications section 107 (Step 6.3). The communications section 107 converts data so that it can be transferred to the image forming apparatus 200, and then transfers the setting and authentication key to the controlling section 201 included in the image forming apparatus 200 (Step 6.4).

The controlling section 201 refers the authentication key to the user authentication section 203 (Step 6.5) to see if the key received from the host computer 100 has authority. Subsequently, the user authentication section 203 checks whether the key is stored in the memory section 204 to see if the key has authority. In this case, the section recognizes that the key is not stored (Step 6.6). The user authentication section 203 then informs the controlling section 201 that the authentication fails (Step 6.7). The controlling section 201 then sends information on the authentication failure to the communications section 107 included in the host computer 100 (Step 6.8). The communications section 107 informs the UI section 101 of the authentication failure (Step 6.9).

On recognizing the failure of the authentication using an authentication key, the UI section 101 calls up user information such as a user ID and password stored in the user information controlling section 104 (Steps S6.10, S6.11) and outputs the information to the communications section 107 (Step 6.12). The process in and after Step 3.3 shown in FIG. 3 follows for re-login to request the issue of a new authentication key. The new key thus acquired is used for the setting-change process implemented again to make a setting change for the image forming apparatus 200. Accordingly, even if the authentication using an authentication key fails, the setting-change process can proceed without interruption through re-login to request the issue of another authentication key.

Here, a term of validity is specified for each authentication key issued by the user authentication section 203 in the image forming apparatus 200. The term of validity is stored together with the corresponding authentication key in the memory section 204 in the image forming apparatus 200. The controlling section 201 deletes the authentication key from the memory section 204 after a predetermined period of time elapses in accordance with the term of validity specified for the key. It is therefore impossible to make any setting change using the authentication key after the term of validity expires.

The term of validity is fixed by an administrator of the image forming apparatus 200 in advance, for example. In this case, the user authentication section 203 stores the predetermined term of validity in the memory section 204 when it issues the authentication key. When the term of validity expires, the key is deleted from the memory section 204.

The term of validity fixed by an administrator of the image forming apparatus 200 may nonetheless be reset every time an authentication key is checked. Specifically, the term of validity for the authentication key is updated when the controlling section 201 in the image forming apparatus 200 checks the authentication key it has received together with changed settings from the host computer 100 against the authentication key stored in the memory section 204 to see if the changes can be made. It is therefore possible to prevent a case where settings can no longer be changed with the same authentication key as a term of validity expires during a series of setting change processing.

Furthermore, it is possible to allow the only one authentication key to be stored in the memory section 204, so that an old authentication key will be deleted from the memory section 204 when a new key is issued by the login of the user. In this case, the user who makes a setting change using an authentication key retains authority to make setting changes until another user logs in.

By thus setting a term of validity for the authentication key, it is possible to prevent a case where unnecessary keys that remain to be saved cause trouble to setting changes when the keys are not regularly deleted because of communications trouble or abnormal termination of the authentication and setting-change program, etc.

What is claimed is:

1. An image forming system, comprising:
    a terminal;
    an image forming apparatus;
    communications means to couple said terminal and said image forming apparatus;
    user interface means to accept an input of user information at login, send the user information from said terminal to said image forming apparatus via said communications means, accept an input of a request of processing after said login, and send the request from said terminal to said image forming apparatus via said communications means;
    said image forming apparatus having user authentication means to check the user information sent from said terminal at said login, issue an authentication key for an authorized user, set a predetermined term of validity for said authentication key issued to said authorized user, send said authentication key from said image forming apparatus to said terminal via said communications means and update the predetermined term of validity by resetting said image forming apparatus every time said image forming apparatus receives said authentication key together with said request for processing;
    wherein when said authentication key sent back to the image forming apparatus with a processing request from the terminal is not recognized by the user authentication means, the user authentication means informs said image forming apparatus which in turn sends an information regarding a failed authentication to the terminal, and upon receiving said information regarding said failed authentication, said terminal invokes a re-login process to request to the image forming apparatus to issue a new authentication key; and
    setting change means to accept an input of setting change information to change a setting for said image forming apparatus: wherein said user interface means has said setting change means, and said user interface means sends the setting change information input with said setting change means together with said authentication key from said terminal to said image forming apparatus via said communications means.

2. The image forming system according to claim 1, wherein said terminal sends said authentication key received from said image forming apparatus to said image forming apparatus via said communications means when sending the request of processing accepted by said user interface means to said image forming apparatus.

3. The image forming system according to claim 1, further comprising user information controlling means to store said authentication key received from said image forming apparatus:
    wherein said terminal has said user information controlling means, and
        said user interface means acquires said authentication key stored in said user information controlling means and sends said authentication key to said image forming apparatus via said communications means when sending said request of processing to said image forming apparatus.

4. The image forming system according to claim 1, wherein said user authentication means deletes said authentication key in response to one of a request from said user interface means and issue of another authentication key by said user authentication means.

5. A non-transitory computer-readable recording medium storing a program that makes a computer of an image forming apparatus coupled to a terminal achieve the functions of:
    receiving user information sent from said terminal;
    verifying said received user information and issuing an authentication key for a user deemed to have authority;
    sending said authentication key to said terminal;
    receiving the authentication key and setting change information to change a setting for said image forming apparatus sent by said terminal;
    changing the setting for said image forming apparatus based on said setting change information if said received authentication key and said issued authentication key correspond;
    setting, by a user authentication means, a predetermined term of validity for said authentication key;
    updating the predetermined term of validity by resetting said image forming apparatus every time said image forming apparatus receives said authentication key together with said request for processing;
    wherein when said received authentication key and said issued authentication key do not correspond, said image forming apparatus sends an information regarding a failed authentication to the terminal, and upon receiving said information regarding said failed authentication, said terminal invokes a re-login process to request to the image forming apparatus to issue a new authentication key, and
    setting change means to accept an input of setting change information to change a setting for said image forming apparatus, wherein user interface means includes said setting change means, and said user interface means sends the setting change information input with said setting change means together with said authentication key from said terminal to said image forming apparatus via a communications means.

6. The non-transitory computer-readable recording medium according to claim 5, wherein: said terminal sends said received authentication key from said image forming apparatus to said image forming apparatus via a communications means when sending the setting change information accepted by a user interface means to said image forming apparatus.

7. The non-transitory computer-readable recording medium according to claim 5, further comprising:
    user information controlling means to store said authentication key received from said image forming apparatus, wherein:

said terminal has said user information controlling means, and a user interface means acquires said authentication key stored in said user information controlling means and sends said authentication key to said image forming apparatus via a communications means when sending the setting change information to said image forming apparatus.

8. The non-transitory computer-readable recording medium according to claim 5, wherein: a user authentication means deletes said authentication key in response to one of a request from a user interface means and issues another authentication key by said user authentication means.

* * * * *